May 14, 1929.    J. R. PARKER    1,712,580
SLOTTING MACHINE
Filed Sept. 9, 1926    4 Sheets-Sheet 1

Inventor
Julius R. Parker
By Attorneys
Southgate Fay + Hawley

May 14, 1929.　　　　J. R. PARKER　　　　1,712,580
SLOTTING MACHINE
Filed Sept. 9, 1926　　　4 Sheets-Sheet 2

Inventor
Julius R. Parker
By Attorneys
Southgate Fay & Hawley

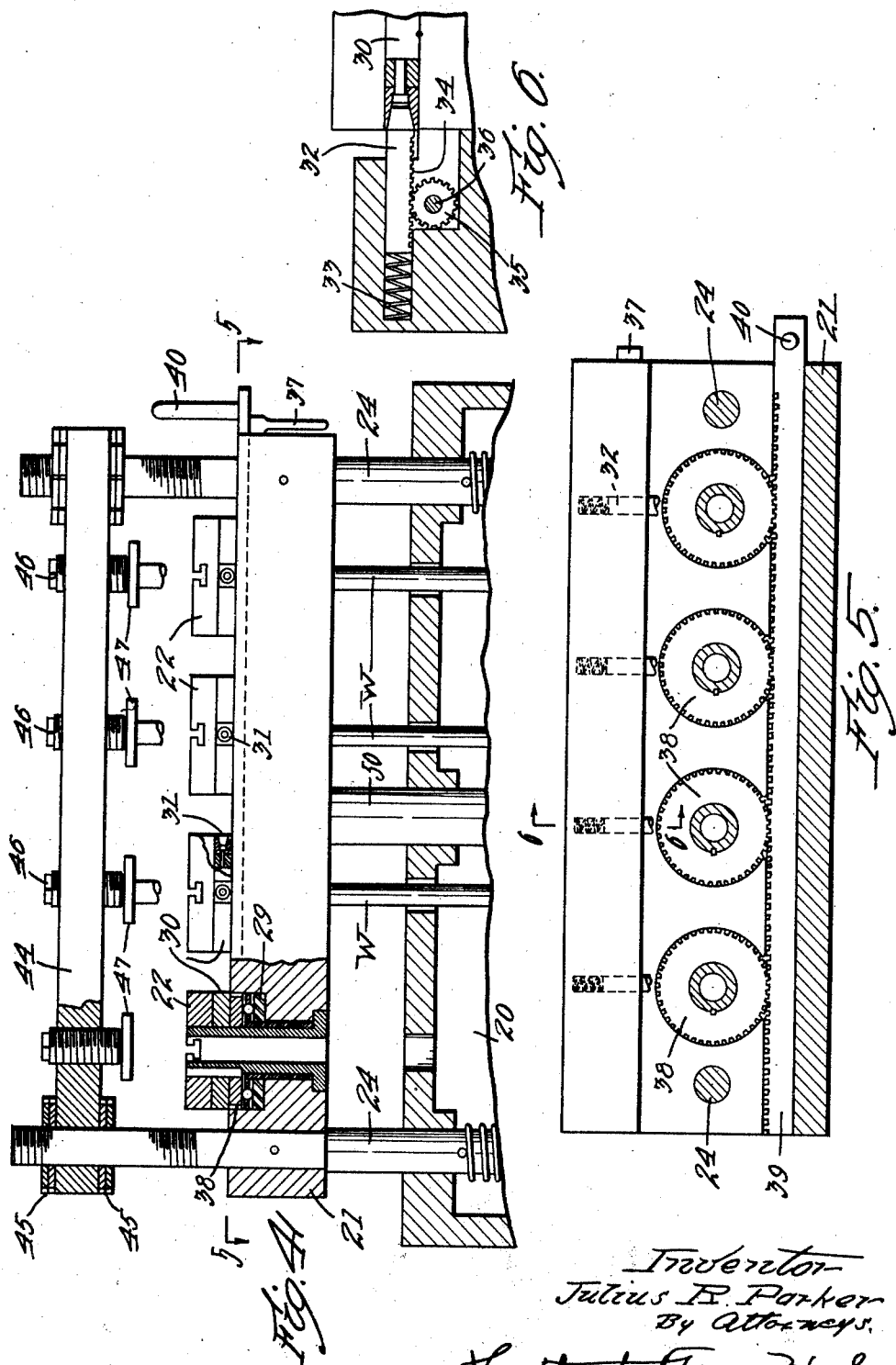

May 14, 1929. J. R. PARKER 1,712,580
SLOTTING MACHINE
Filed Sept. 9, 1926 4 Sheets-Sheet 4
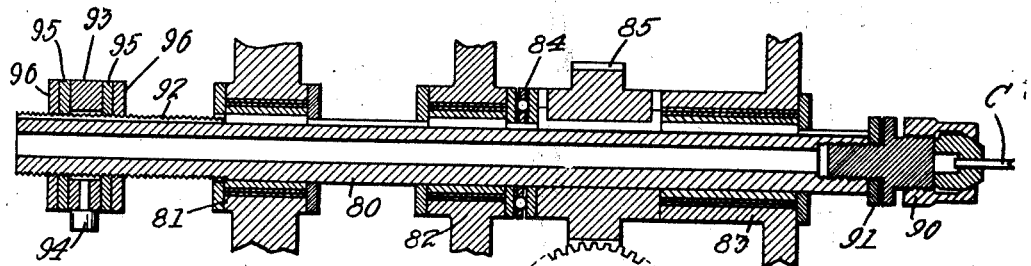
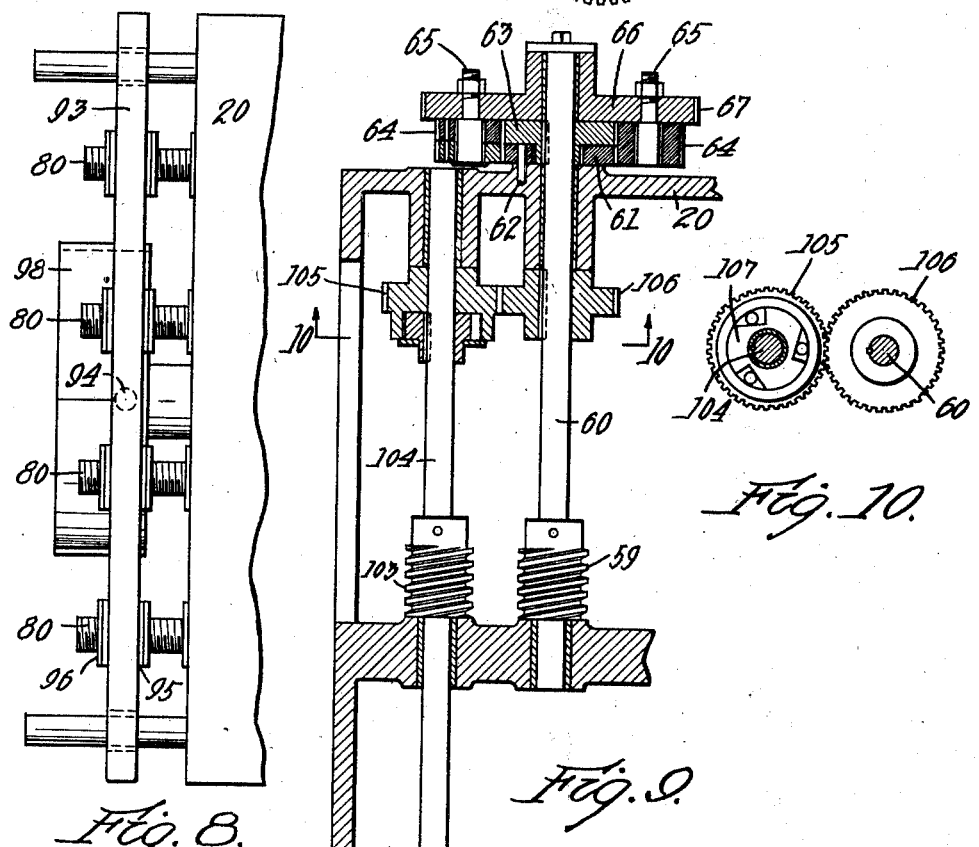

Patented May 14, 1929.

1,712,580

UNITED STATES PATENT OFFICE.

JULIUS R. PARKER, OF WINDSOR, VERMONT.

SLOTTING MACHINE.

Application filed September 9, 1926. Serial No. 134,518.

This invention relates to a machine for cutting slots in different articles such as longitudinal keyways in shafting. The machine may also be used for slotting many other types of articles and for performing certain milling or drilling operations.

It is the general object of my invention to provide a machine by which such operations may be quickly and cheaply performed and in which the operation is substantially automatic and requires little or no attention from the operator after the machine is thrown into operation.

To the attainment of this object, important features of the invention relate to the provision of means for automatically advancing and withdrawing the cutter relatively to the work; to the provision of means for varying the rate of movement of certain machine elements during the operation of the machine; and to the provision of means for stopping the machine at the end of a completed operation.

A further object is to provide means by which a plurality of slots may be cut in predetermined angular relation to each other. I have also provided means for slotting a plurality of articles at the same time.

My invention further relates to arrangements and combinations of parts which will be hereinafter described and more particularly pointed out in the appended claims.

A preferred form of the invention is shown in the drawings in which

Fig. 4 is a partial front elevation of the work supporting mechanism, with certain parts shown in section;

Fig. 5 is a sectional plan view, taken along the line 5—5 in Fig. 4;

Fig. 6 is a sectional side elevation, taken along the line 6—6 in Fig. 5;

Fig. 7 is a sectional side elevation of one of the cutter shafts, taken along the line 7—7 in Fig. 1;

Fig. 8 is a partial plan view, showing the mechanism for simultaneously advancing the several cutter shafts toward the work or withdrawing the same therefrom;

Fig. 9 is a sectional plan view of certain driving mechanism to be described; and Fig. 10 is a detail sectional elevation, taken along the line 10—10 in Fig. 9.

*Work supporting means.*

Figure 1:
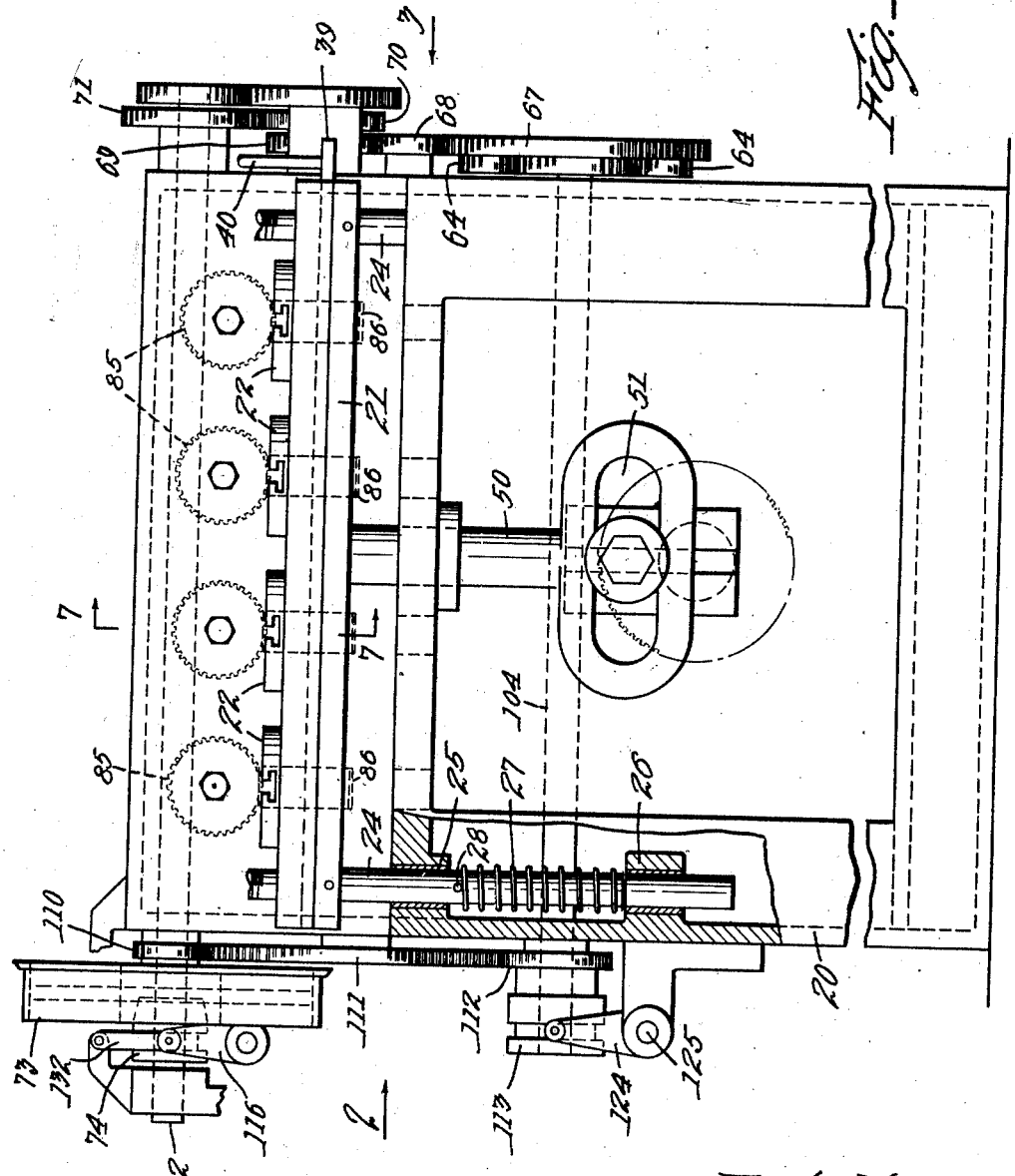
Fig. 1 is a front elevation of my improved machine.
Figure 2:
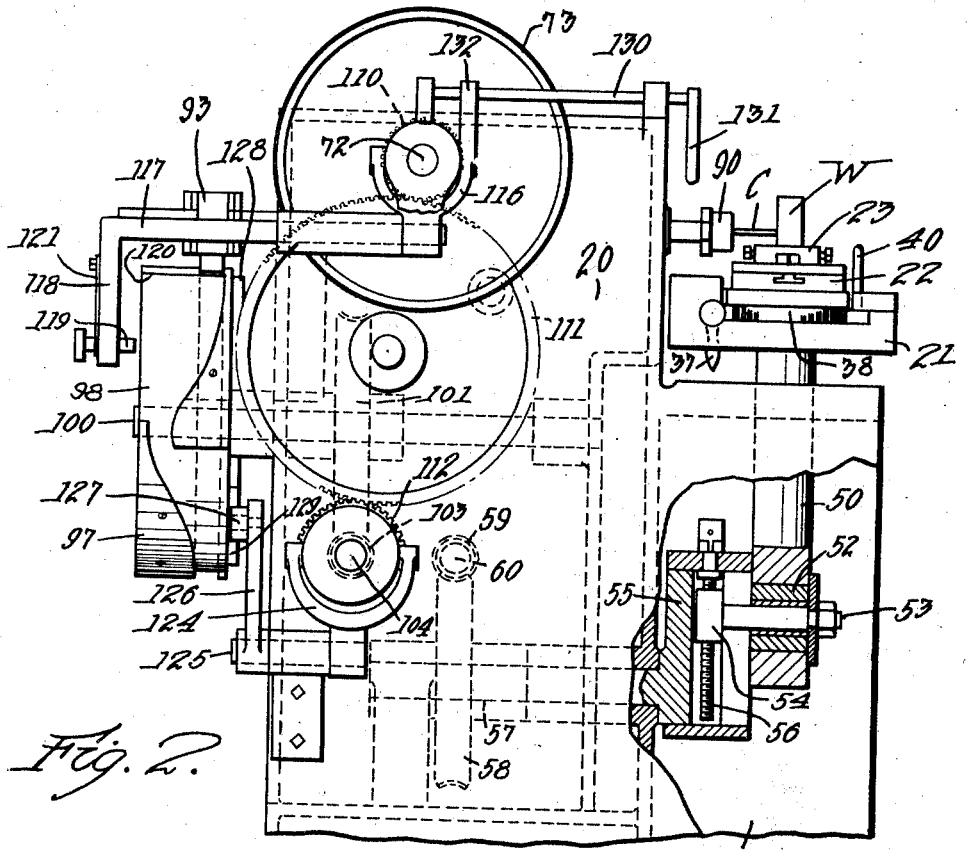
Fig. 2 is a left hand side elevation, looking in the direction of the arrow 2 in Fig. 1.

Referring to the drawings, I have shown a machine for simultaneously slotting a plurality of shafts or other articles, said machine being provided with a base or frame 20 on which a work supporting cross head 21 (Fig. 1) is mounted for vertical travel. The cross head 21 supports a plurality of rotatably mounted face plates 22 to which pieces of work W may be secured by any suitable form of jig or chuck 23 (Fig. 2).

The cross head 21 is supported on vertical rods or plungers 24 (Fig. 1) slidable in upper and lower bearings 25 and 26 in the base 20. Springs 27 may be provided above the lower bearings 26, said springs engaging cross pins 28 in the plungers 24 and acting to partially offset or counterbalance the weight of the cross head 21 and the parts supported thereby.

The work supporting plates 22 are preferably mounted for angular movement in the cross head 21 and may be supported by anti-friction bearings 29 (Fig. 4). A disc 30 is provided for each plate 22 and each disc has notches or openings 31 formed therein to receive the end of a locking plunger 32 (Fig. 6). The plunger 32 is pressed yieldingly to locking position by a spring 33 engaging the rear end of the plunger, and each plunger is provided with rack teeth 34 meshing with one of the pinions 35 on a shaft 36 extending longitudinally of the cross head 21. A handle 37 (Fig. 4) is provided at one end of the shaft 36, by the use of which the pinions 35 may be simultaneously rotated to withdraw the several plungers 32.

An additional disc 38 (Figs. 4 and 5) is provided for each work holder and these discs are each provided with teeth meshing with a rack bar 39 slidable longitudinally in the cross head 21 and provided with an operating handle 40 at one end thereof. When the plungers 32 have been withdrawn by means of the handle 37, the work holders may be simultaneously moved angularly to new positions by movement of the rack bar 39 engaging the toothed discs 38.

I have thus provided means for simultaneously rotating the work holders and for locking the holders in predetermined angular relations. This construction of the work holder is particularly desirable for such operations as milling keyways in shafts where two or more keyways are desired in exact spaced angular relation to each other.

It is sometimes desirable to clamp the work against the face of the work holder 22 and for this purpose I provide an additional cross bar 44 (Fig. 4) adjustably secured to the threaded upper ends of the rods 24 by lock nuts 45 positioned above and below the cross bar 44. Studs 46 are threaded in the cross bar 44 and are provided with members 47 at their lower ends adapted to engage the work supported on the different face plates 22. After the work has been placed in position, the different studs 46 may be tightened against the work by means of a wrench or in any other convenient manner.

Work table operating mechanism.

For the purpose of raising and lowering the work past the ends of the cutters C, the work supporting cross head 21 is provided with a depending member 50 (Fig. 1) having a transversely extending horizontal slot 51 formed at its lower end to receive a roller 52 (Fig. 2) on a crankpin 53 mounted on a threaded block 54. The block 54 is slidable radially in guide-ways in a crank arm 55 and may be adjusted radially as desired by turning a threaded stud or screw 56 mounted for rotation but held from axial movement in the arm 55 and threaded into the block 54. The extent of vertical travel of the work past the cutters may thus be determined by radial adjustment of the crankpin 53. The crank arm 55 is mounted on a shaft 57 having a worm gear 58 secured thereto and meshing with a worm 59 (Fig. 9) on a worm shaft 60.

Worm shaft driving mechanism.

Figure 3:
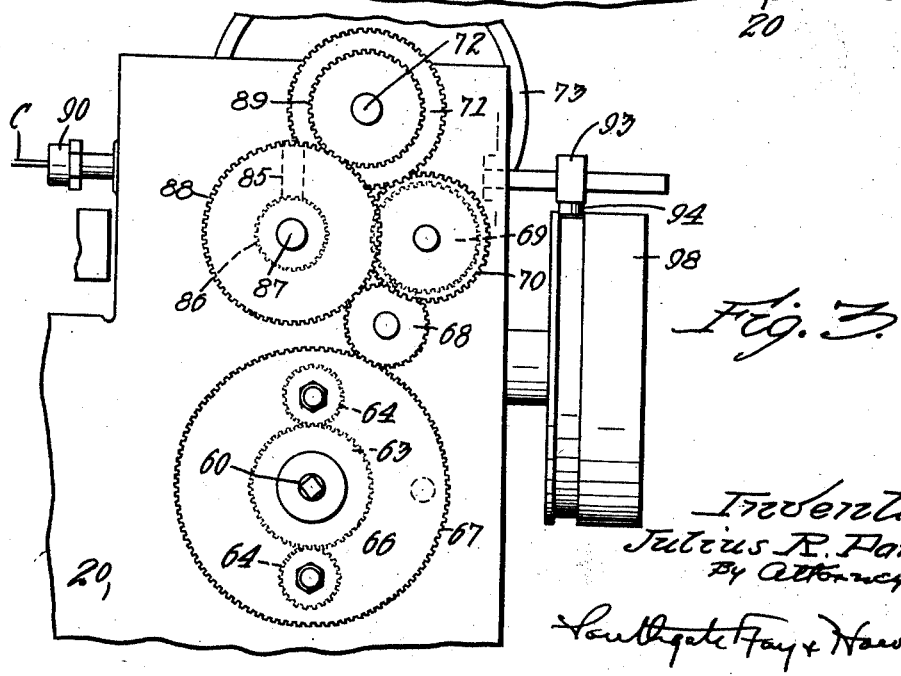
Fig. 3 is a partial right hand side elevation, looking in the direction of the arrow 3 in Fig. 1.

The driving mechanism for the worm shaft 60 is best shown in Figs. 3 and 9 and will now be described. A gear 61 (Fig. 9) is mounted concentric with the shaft 60 but is held from rotation by a pin 62 extending through the gear 61 into the frame 20. A gear 63 is keyed to the shaft 60 and is mounted closely adjacent to the gear 61. The gears 61 and 63 are preferably of the same size and differ from each other by a single tooth only. Both gears are engaged by pinions 64 loosely mounted on studs 65 fixed in a driving plate 66 loosely mounted on shaft 60, and having gear teeth 67 on its periphery.

The parts thus far described form a type of differential gearing which will cause the movable gear 63 to advance a single tooth relatively to the fixed gear 61 for each rotation of the driving plate 66. The gears 61 and 63 may be given any desired number of teeth, commonly around sixty, so that the worm 59 will make one rotation for perhaps sixty rotations of the driving plate 66.

The teeth 67 of the plate 66 are driven through a train of gears 68, 69, 70 and 71 (Fig. 3) from a driving shaft 72 mounted in bearings in the upper part of the frame 20 and having a driving pulley 73 loosely mounted thereon and rotatable from any usual source of power. A clutch collar 74 is keyed to the shaft 72 and may be used to start and stop the shaft 72 as will be hereinafter described.

I have thus provided means for slow continuous rotation of the worm shaft 60 and for still slower continuous rotation of the crankshaft 57 and crankpin 53. The work head 21 will thus be moved slowly upward and downward past the slotting cutters C.

Spindle driving mechanism.

I will now describe the mechanism provided for supporting and driving the slotting cutters C. For this purpose I have provided a series of cutter spindles 80 (Fig. 7) rotatable in bearings 81, 82 and 83 in the upper portion of the frame 20. A thrust bearing 84 for each spindle is also provided adjacent each bearing 82, to receive the rearward pressure of spiral gears 85 keyed to each spindle 80 and engaged by corresponding spiral gears 86 on a cross shaft 87 (Fig. 3). The shaft 87 is provided at one end with a gear 88 meshing directly with a gear 89 on the driving shaft 72 previously described.

The cutter spindles 80 are thus simultaneously rotated at approximately the speed of the driving shaft 72. Any suitable provision may be made for securing the cutters C to the spindles 80. I have indicated in Fig. 7 a common form of chuck 90 threaded into the end of the spindle 80 and provided with a lock nut 91.

Each spindle 80 (Fig. 7) is freely slidable through the several bearings thereof and also through the spiral gear 85 keyed thereon and by which it is driven. The rear portion of each spindle 80 is threaded as indicated at 92 (Fig. 7) and extends through a cross member 93 having a cam roll 94 mounted on its lower face near the middle of its length. Threaded collars 95 and lock nuts 96 are secured in adjusted relation on the threaded ends 92 of the cutter spindles, so that they closely engage the cross member 93 but are freely rotatable at each side thereof.

The cam roll 94 is engaged by cam plates 97 (Fig. 2) secured to a drum 98 which is slowly rotated during the slotting operation. As the drum rotates, it simultaneously advances the several cutters C toward the work and feeds the cutters into the work during the slotting operation and thereafter withdraws the cutters when the cut is completed.

While I have shown a single drum and a cam roll positioned at the middle of the cross member 93, it may be desirable in large machines to provide additional cam rolls and drums so that pressure may be applied to the cross member at more than a single point.

Drum driving mechanism.

I have provided means for rotating the drum 98 slowly during the cutting operation and more rapidly during the withdrawal of the cutter from the work and during the completion of a full revolution of the drum. The drum 98 is mounted on a shaft 100 (Fig. 2) supported in bearings in the frame 20 and having a worm wheel 101 secured thereto and engaged by a worm 103 (Fig. 9) on a worm shaft 104. The shaft 104 is normally connected with the worm shaft 60 previously described by a pair of gears 105 and 106 (Fig. 9). The gear 106 is keyed to the continuously rotated worm shaft 60 and the gear 105 is connected to the worm shaft 104 by a ball clutch 107 (Fig. 10). Under normal conditions, this provides a positive slow speed drive from the shaft 60 to the drum 98.

For rotating the drum more rapidly, I provide means for connecting the worm shaft 104 more directly to the driving shaft 72. For this purpose a gear 110 (Figs. 1 and 2) is secured to the driving shaft 72 and meshes with a large idle gear 111, which in turn engages a gear 112 loosely mounted on the worm shaft 104. A friction clutch 113 is provided by which the gear 112 may be connected to rotate the worm shaft 104.

When thus connected, the worm shaft is rotated at relatively high speed, such rotation being permitted by the ball clutch 107 (Fig. 10) which is immediately loosened by rotation of the shaft 104 at a speed greater than that of he gear 105.

Speed control and stopping mechanism.

I have provided means for shifting the clutch members 74 and 113 for starting and stopping the machine and for varying the speed of rotation of the worm shaft 104 and drum 98. The clutch 74 on the driving shaft 72 is controlled by a yoke lever 116 (Fig. 1) mounted on a laterally extending shaft 117 (Fig. 2) and provided with an arm 118 having a spring pressed stud 119 positioned for engagement by cam plates 120 on the outer side of the drum 97. The stud 119 is held yieldingly in operative position by a spring 121 but may be manually withdrawn from the path of the cam plates 120 for a purpose to be described.

The clutch 113 on the worm shaft 104 is similarly provided with a yoke lever 124 (Fig. 1) mounted on a short shaft 125 (Fig. 2) and having an arm 126 secured at its opposite end and provided with a cam roll 127 engaged by cam plates 128 on the inner side face of the drum 98.

A stop lever 130 (Fig. 2) is mounted at the top of the frame and is provided with a handle 131 at its front end, and with an arm 132 at its rear end engaging the yoke lever 116 for the driving clutch 74.

If it is desired to stop the machine manually for any purpose, the handle 131 may be used to disengage the clutch 74 without waiting for the operation of the cam plates 120 on the drum 98.

The general operation of the controlling and stopping mechanism is as follows:

The machine is started in operation by causing the clutch 74 to engage the driving pulley 73. The crank arm 55 is thus caused to rotate, reciprocating the work upward and downward past the cutters C. At the same time the drum 98 rotates slowly, advancing the cutters C to operative position and thereafter gradually feeding them into the work to increase the depth of cut as the work is repeatedly reciprocated.

After the cutters have been advanced to the full depth of cut and the cut has been completed, a cam plate 128 on the side of the drum 98 causes the clutch 113 to engage and drive the worm shaft 104 at relatively high speed, thus correspondingly increasing the speed of rotation of the drum 98.

As the parts approach their initial starting position, a second cam plate 129 disengages the clutch 113, while at the same time a cam plate 120 on the outer side of the drum 98 engages the stud 119 on the yoke lever arm 118 and moves the same in a direction to disengage the clutch 74, thus stopping the rotation of the driving shaft and of all the mechanism actuated thereby.

When it is desired to start the machine again in operation, the stud 119 may be withdrawn beyond the face of the cam plate 120, after which the clutch lever may be moved manually to cause the clutch 74 to be engaged with the driving pulley 72. As the drum 98 thereafter rotates, the stud 119 will eventually pass off of the side of the cam plate 120 and will then snap into position for engagement by the operative face of the cam plate as a full revolution of the drum 98 is again completed.

General operation.

Having described the details of construction of my improved slotting machine, it will be seen that I have provided a machine in which a plurality of pieces of work W may be slotted simultaneously, and that the slotting operation is performed entirely automatically after the work has been placed in the work holders and the clutch 74 has been engaged with the driving pulley 73. The tools will be advanced toward the work and will be gradually fed into the work during continued reciprocation thereof. At the completion of the work, the tools will be withdrawn at increased speed and the drum 98 will be quickly rotated to its original position, where slow speed will again become operative, and where the driving mechanism will be brought to rest in position for changing the work and repeating the procedure outlined above.

The length of cut in the work is determined by the throw of the crank pin 53, and the depth of cut is determined by the shape of the cam plates 97 on the drum 98. When changing from one piece of work to another, the cam plates 97 will be changed as may be necessary to provide the desired depth of cut.

I have also provided means for forming slots in desired angular relation in pieces of shaft or other similar work and for simultaneously setting the several work holders in different angular positions.

Having thus described my invention and the advantages thereof I do not wish to be limited to the details herein disclosed otherwise than as set forth in the claims, but what I claim is:—

1. A slotting machine having in combination, a rotating cutter, a work holder, means to reciprocate said work holder, and positively acting means including a cam effective to automatically feed said cutter axially to a predetermined depth of cut and to withdraw said cutter from the work during the reciprocation of said work holder.

2. A slotting machine having in combination, a rotating cutter, a work holder, means to reciprocate said work holder, and cam means effective to automatically feed said cutter axially to a predetermined depth of cut during the reciprocation of said work holder, said cam means being provided with detachable cam plates replaceable to produce different depths and rates of cut.

3. A slotting machine having in combination, a rotating cutter, a work holder, means to reciprocate said work holder, means to advance the cutter to working position and to automatically feed the cutter axially to a predetermined depth of cut while the work is reciprocated, and means to withdraw the cutter and to stop the machine at the completion of the cut.

4. A slotting machine having in combination, a rotating cutter, a work holder, means to reciprocate said work holder, means to advance the cutter to working position and to automatically feed the cutter axially to a predetermined depth of cut while the work is reciprocated, and means to withdraw the cutter and stop the machine at the completion of the cut, said latter means operating at a relatively higher speed.

5. A slotting machine having in combination, a rotating cutter, a work holder, means to reciprocate said work holder, a cam drum having plates thereon effective to advance said cutter axially to working position, to feed said cutter to a predetermined depth of cut as the work is reciprocated, and to withdraw said cutter at the completion of the cut.

6. A slotting machine having in combination, a rotating cutter, a work holder, means to reciprocate said work holder, a cam drum having plates thereon effective to advance said cutter axially to working position, to feed said cutter to a predetermined depth of cut as the work is reciprocated, and to withdraw said cutter at the completion of the cut, and automatic means to rotate said cam drum slowly until the completion of the cut and more rapidly during the withdrawal of the cutter.

7. A slotting machine having in combination, a rotating cutter, a work holder, means to reciprocate said work holder, a cam drum having plates thereon effective to advance said cutter axially to working position, to feed said cutter to a predetermined depth of cut as the work is reciprocated, and to withdraw said cutter at the completion of the cut, continuously-operated slow-speed driving mechanism for said drum, intermittently-operated high speed driving mechanism for said drum, and means to make said slow speed and said high speed mechanisms alternately operative.

8. A slotting machine having in combination, a rotating cutter, a work holder, means to reciprocate said work holder, a cam drum having plates thereon effective to advance said cutter axially to working position, to feed said cutter to a predetermined depth of cut as the work is reciprocated, and to withdraw said cutter at the completion of the cut, continuously-operated slow speed driving mechanism for said drum, intermittently-operated high speed driving mechanism for said drum, and an overrunning clutch in said slow speed driving mechanism permitting operation of the high speed driving mechanism.

9. A slotting machine having in combination, a rotating cutter, a work holder, positively acting automatic means to reciprocate said work holder and to move said cutter axially toward and away from the work supported on said work holder, and means to index said work holder to different predetermined angular positions relative to said cutter.

10. A slotting machine having in combination, a plurality of rotatable work holders, a rotating cutter for each work holder, positively acting automatic means to simultaneously advance said cutters to working position, and means to simultaneously index said work holders to different angular positions when said cutters are withdrawn.

11. A slotting machine having in combination, a plurality of rotatable work holders, a rotating cutter for each work holder, positively acting automatic means to simultaneously advance said cutters axially to working position, a locking plunger for each work holder, a single means to withdraw all of said plungers, and means to simultaneously adjust said work holders angularly when said plungers are withdrawn.

12. A slotting machine having in combination, a plurality of rotatable work holders, a rotating cutter for each work holder, positively acting automatic means to simultaneously advance said cutters axially to working position, means to simultaneously rotate said work holders to different angular positions when said cutters are withdrawn, and means to lock each work holder in operative position.

13. A slotting machine having in combination, a plurality of rotating cutters, a plurality of work holders, a cross head supporting said work holders, and a cam drum connected to position said cutters axially and effective to move said cutters simultaneously toward and from the work and to feed said cutters slowly into the work as the cross head and work holders are reciprocated.

14. In a slotting machine a plurality of work holders, a cross head in which said holders are mounted for angular adjustment, a cross bar mounted in spaced relation above said cross head but movable therewith, and an adjustable clamping device on said cross bar for each work holder.

15. In a slotting machine, a plurality of work holders, a cross head in which said holders are mounted for angular adjustment, a cross bar mounted in spaced relation above said cross head but movable therewith, and a clamping device on said cross bar for each work holder, said cross bar being adjustable toward and from said cross head, and said clamping devices being separably adjustable to clamp the work against each separate work holder.

16. A slotting machine having in combination, a plurality of work holders, a plurality of cutter spindles and cutters, means to regularly reciprocate said work holders past said cutters, automatic means to feed said cutters axially a predetermined distance into the work while the work is reciprocated, automatic means to withdraw the cutters when the cut is completed, and automatic means to stop the machine when all parts are returned to initial position.

17. A slotting machine having in combination, a plurality of work holders, a plurality of cutter spindles and cutters, means to regularly reciprocate said work holders past said cutters, automatic means to feed said cutters axially a predetermined distance into the work while the work is reciprocated, automatic means to withdraw the cutters when the cut is completed, automatic means to stop the machine when all parts are returned to initial position, and means to simultaneously adjust the several work holders angularly for additional cuts.

18. A slotting machine having in combination, a plurality of rotating cutters, a plurality of work holders, a cross head supporting said work holders, a cam drum connected to position said cutters axially and effective to move said cutters simultaneously toward and from the work and to feed said cutters slowly into the work as the cross head and work holders are reciprocated, means to rotate said cam drum at slow speed during the cutting operation, and means to rotate said cam drum at a higher speed after the cut is completed for withdrawing the cutter and restoring the drum to initial position.

19. A slotting machine having in combination, a plurality of rotating cutters, a plurality of work holders, a cross head supporting said work holders, a cam drum connected to position said cutters axially and effective to move said cutters simultaneously toward and from the work and to feed said cutters slowly into the work as the cross head and work holders are reciprocated, means to rotate said cam drum at slow speed during the cutting operation, and means to rotate said cam drum at a higher speed after the cut is completed for withdrawing the cutter and restoring the drum to initial position, said high and slow speed means being controlled directly from said cam drum.

20. A slotting machine having in combination, a plurality of rotating cutters, a plurality of work holders, a cross head supporting said work holders, a cam drum connected to position said cutters axially and effective to move said cutters simultaneously toward and from the work and to feed said cutters slowly into the work as the cross head and work holders are reciprocated, means to rotate said cam drum at slow speed during the cutting operation, means to rotate said cam drum at a higher speed after the cut is completed for withdrawing the cutter and restoring the drum to initial position, said high and slow speed means being controlled directly from said cam drum, and connections from said cam drum effective to stop the machine at the completion of a single revolution of said drum.

21. A slotting machine having in combination a rotating cutter, a work holder, means to reciprocate said work holder through one plane, and means including a cam effective to automatically feed said cutter axially to a predetermined depth of cut through a plane at right angles to the plane of reciprocation of said work holder during such reciprocation.

In testimony whereof I have hereunto affixed my signature.

JULIUS R. PARKER.